United States Patent
Inami (10) Patent No.: US 10,939,010 B2
(45) Date of Patent: Mar. 2, 2021

(54) INFORMATION PROCESSING SYSTEM, INFORMATION PROCESSING APPARATUS, IMAGE FORMING APPARATUS

(71) Applicant: KYOCERA Document Solutions Inc., Osaka (JP)

(72) Inventor: Nozomu Inami, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 50 days.

(21) Appl. No.: 16/418,402

(22) Filed: May 21, 2019

(65) Prior Publication Data
US 2019/0364166 A1    Nov. 28, 2019

(30) Foreign Application Priority Data
May 22, 2018 (JP) .............................. JP2018-097890

(51) Int. Cl.
    *H04N 1/00*             (2006.01)

(52) U.S. Cl.
    CPC ..... *H04N 1/00867* (2013.01); *H04N 1/00875* (2013.01); *H04N 2201/0094* (2013.01)

(58) Field of Classification Search
CPC .......................... G06F 3/1239; H04N 1/00838
See application file for complete search history.

(56) References Cited

U.S. PATENT DOCUMENTS

| | | | | |
|---|---|---|---|---|
| 2003/0063144 A1* | 4/2003 | Kusakabe | ............. | G06T 1/0028 347/15 |
| 2005/0041263 A1* | 2/2005 | Ishikawa | ............ | H04N 1/00875 358/1.14 |
| 2007/0097413 A1* | 5/2007 | Nakai | ................ | H04N 1/00846 358/1.14 |
| 2009/0244639 A1* | 10/2009 | Itoh | ........................ | G06K 1/121 358/3.28 |

FOREIGN PATENT DOCUMENTS

JP            2009272796 A      11/2009

* cited by examiner

*Primary Examiner* — King Y Poon
*Assistant Examiner* — Michael Burleson
(74) *Attorney, Agent, or Firm* — Alleman Hall Creasman & Tuttle LLP (57) ABSTRACT

An information processing system adds density information to a first specific region of a document sheet represented by image data, the density information being indicated by a reference density lower than a density index value derived based on densities of pixels included in the image data. The system adds predetermined restriction information to the image data, the restriction information being indicated by a density equal to or higher than the reference density. The system acquires, as a determined density, a density of the first specific region. The system determines, based on the image data, whether a second specific region that is a part or all of a region of the document sheet, includes the restriction information indicated by a density that is equal to or higher than the determined density. If so, the system restricts a specific process concerning the image data from being executed.

8 Claims, 10 Drawing Sheets

FIG.9B

INFORMATION PROCESSING SYSTEM, INFORMATION PROCESSING APPARATUS, IMAGE FORMING APPARATUS

INCORPORATION BY REFERENCE

This application is based upon and claims the benefit of priority from the corresponding Japanese Patent Application No. 2018-097890 filed on May 22, 2018, the entire contents of which are incorporated herein by reference.

BACKGROUND

The present disclosure relates to a technology for restricting a specific process from being performed on image data.

In some image forming apparatuses, a print is generated based on image data. There is known a technology that adds restriction information to the periphery of a document sheet represented by image data, wherein the restriction information indicates, by a specific sign, that a specific process is restricted (for example, a copy process is prohibited). In the image forming apparatuses, when the restriction information is detected from the image data, a copy process is restricted from being performed based on the image data.

SUMMARY

An information processing system according to an aspect of the present disclosure includes a first addition processing portion, a second addition processing portion, a density acquiring portion, a determination processing portion, and a restriction processing portion. The first addition processing portion adds density information to a first specific region of a document sheet represented by image data, the density information being indicated by a reference density that is lower than a density index value that is derived based on densities of pixels included in the image data. The second addition processing portion adds predetermined restriction information to the image data, the restriction information being indicated by a density that is equal to or higher than the reference density. The density acquiring portion acquires, as a determined density, a density of the first specific region in the document sheet represented by the image data. The determination processing portion determines, based on the image data, whether or not a second specific region that is a part or all of a region of the document sheet, includes the restriction information which is indicated by a density that is equal to or higher than the determined density. The restriction processing portion, when the determination processing portion determines that the second specific region includes the restriction information, restricts a specific process concerning the image data from being executed.

An information processing apparatus according to another aspect of the present disclosure includes a density acquiring portion, a determination processing portion, and a restriction processing portion. The density acquiring portion acquires, as a determined density, a density of a first specific region in a document sheet represented by image data. The determination processing portion determines, based on the image data, whether or not a second specific region that is a part or all of a region of the document sheet, includes predetermined restriction information which is indicated by a density that is equal to or higher than the determined density. The restriction processing portion, when the determination processing portion determines that the second specific region includes the restriction information, restricts a specific process concerning the image data from being executed.

An information processing apparatus according to a further aspect of the present disclosure includes a first addition processing portion and a second addition processing portion. The first addition processing portion adds density information to a first specific region of a document sheet represented by image data, the density information being indicated by a reference density that is lower than a density index value that is derived based on densities of pixels included in the image data. The second addition processing portion adds restriction information to a second specific region that is a part or all of a region of the document sheet, the restriction information being indicated by a density that is equal to or higher than the reference density.

An image forming apparatus according to a still further aspect of the present disclosure includes an information processing apparatus. Specifically, as a first aspect, the information processing apparatus includes a density acquiring portion, a determination processing portion, and a restriction processing portion. The density acquiring portion acquires, as a determined density, a density of a first specific region in a document sheet represented by image data. The determination processing portion determines, based on the image data, whether or not a second specific region that is a part or all of a region of the document sheet, includes predetermined restriction information which is indicated by a density that is equal to or higher than the determined density. The restriction processing portion, when the determination processing portion determines that the second specific region includes the restriction information, restricts a specific process concerning the image data from being executed. In addition, as a second aspect, the information processing apparatus includes a first addition processing portion and a second addition processing portion. The first addition processing portion adds density information to a first specific region of a document sheet represented by image data, the density information being indicated by a reference density that is lower than a density index value that is derived based on densities of pixels included in the image data. The second addition processing portion adds restriction information to a second specific region that is a part or all of a region of the document sheet, the restriction information being indicated by a density that is equal to or higher than the reference density.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
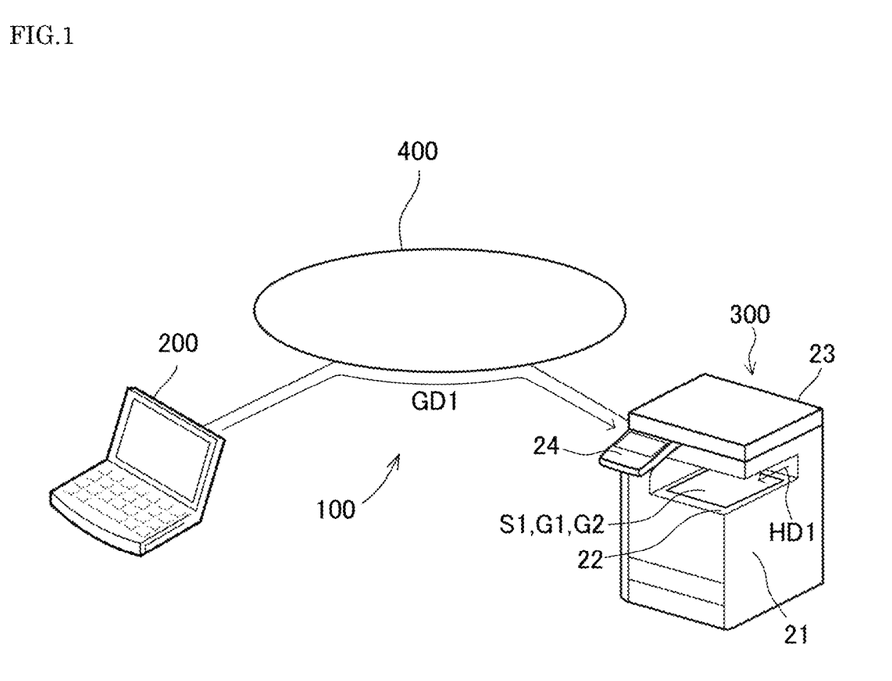
FIG. 1 is a diagram showing a configuration of an information processing system according to an embodiment of the present disclosure.

As shown in FIG. 1, an information processing system 100 includes an information processing apparatus 200 and an image forming apparatus 300. The information processing apparatus 200 and the image forming apparatus 300 are connected with each other in such a way as to perform a data communication via a communication network 400 such as a LAN (Local Area Network).

The information processing apparatus 200 is, for example, a personal computer. The information processing apparatus 200 generates first image data GD1 based on which a print process is executed by the image forming apparatus 300. The information processing apparatus 200 transmits the first image data GD1 to the image forming apparatus 300 via the communication network 400.

The image forming apparatus 300 is, for example, a multifunction peripheral having a printer function, a copy function, and a facsimile function, and is configured to execute a print process, a copy process and the like.

Upon receiving the first image data GD1 via the communication network 400, the image forming apparatus 300 executes the print process. The image forming apparatus 300 includes an image forming portion 21 and a discharge portion 22. In the print process, the image forming portion 21 prints an image on a sheet S1 based on the first image data GD1. The image forming apparatus 300 discharges the sheet S1 with the image printed thereon, to the discharge portion 22 as a document sheet G1.

In addition, the image forming apparatus 300 further includes an image reading portion 23 and an operation/display portion 24, and executes the copy process after the document sheet G1 is set to the image reading portion 23 and a start button (not shown) included in the operation/display portion 24 is operated. It is noted that the document sheet G1 is not limited to being generated by the image forming apparatus 300 included in the information processing system 100, but may be generated by another image forming apparatus (not shown). In the copy process, the image forming apparatus 300 optically reads the document sheet G1 and generates second image data GD2 that represents the document sheet G1. Thereafter, the image forming apparatus 300 prints an image on another sheet S1 based on the second image data GD2. The image forming apparatus 300 discharges the sheet S1 with the image of the document sheet G1 printed thereon, to the discharge portion 22 as a copy G2. Hereinafter, a direction in which the document sheet G1 and the copy G2 are discharged from the image forming apparatus 300 is referred to as a discharge direction HD1.

Figure 2:
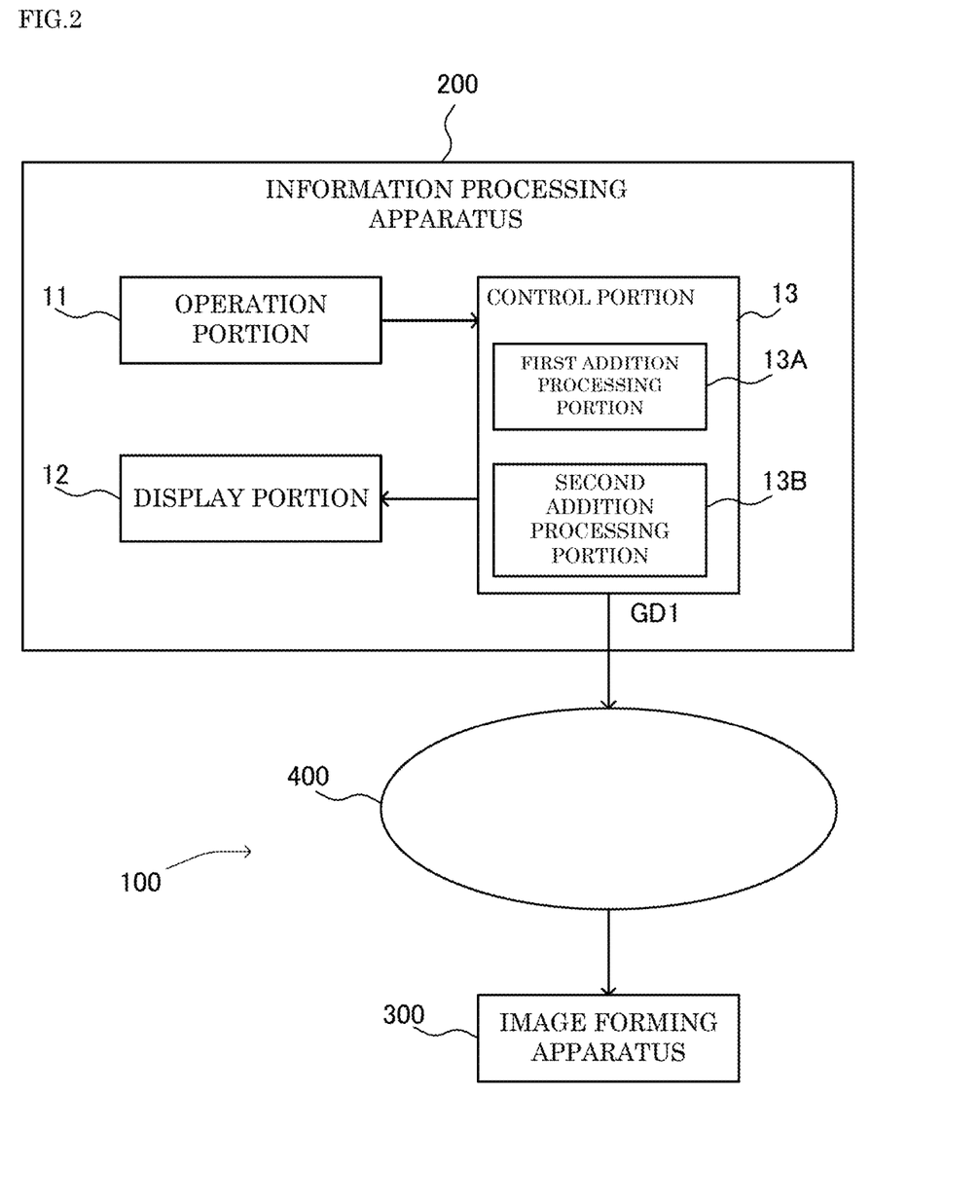
FIG. 2 is a block diagram showing a configuration of an information processing apparatus shown in FIG. 1.

The following describes a detailed configuration of the information processing apparatus 200 with reference to FIG. 2.

The information processing apparatus 200 includes an operation portion 11, a display portion 12, and a control portion 13. It is noted that the information processing apparatus 200 is an example of an information processing apparatus of the present disclosure.

The operation portion 11 includes a keyboard and a mouse, and receives operations performed by an operator (hereinafter referred to as a first operator) of the information processing apparatus 200. The display portion 12 is, for example, a liquid crystal display, and displays various types of images.

The control portion 13 includes a first addition processing portion 13A and a second addition processing portion 13B. In addition, the control portion 13 includes a CPU, a ROM, a RAM, and a nonvolatile memory. The CPU executes various programs that are preliminarily stored in the ROM, by using the RAM as a working area. Specifically, the various programs include driver software (hereinafter referred to as a driver) for controlling the image forming apparatus 300 from the information processing apparatus 200. The control portion 13 functions as the first addition processing portion 13A and the second addition processing portion 13B by executing the driver.

The following describes a specific example of a process of the information processing apparatus 200 with reference to FIG. 2 to FIG. 5.

Figure 3:
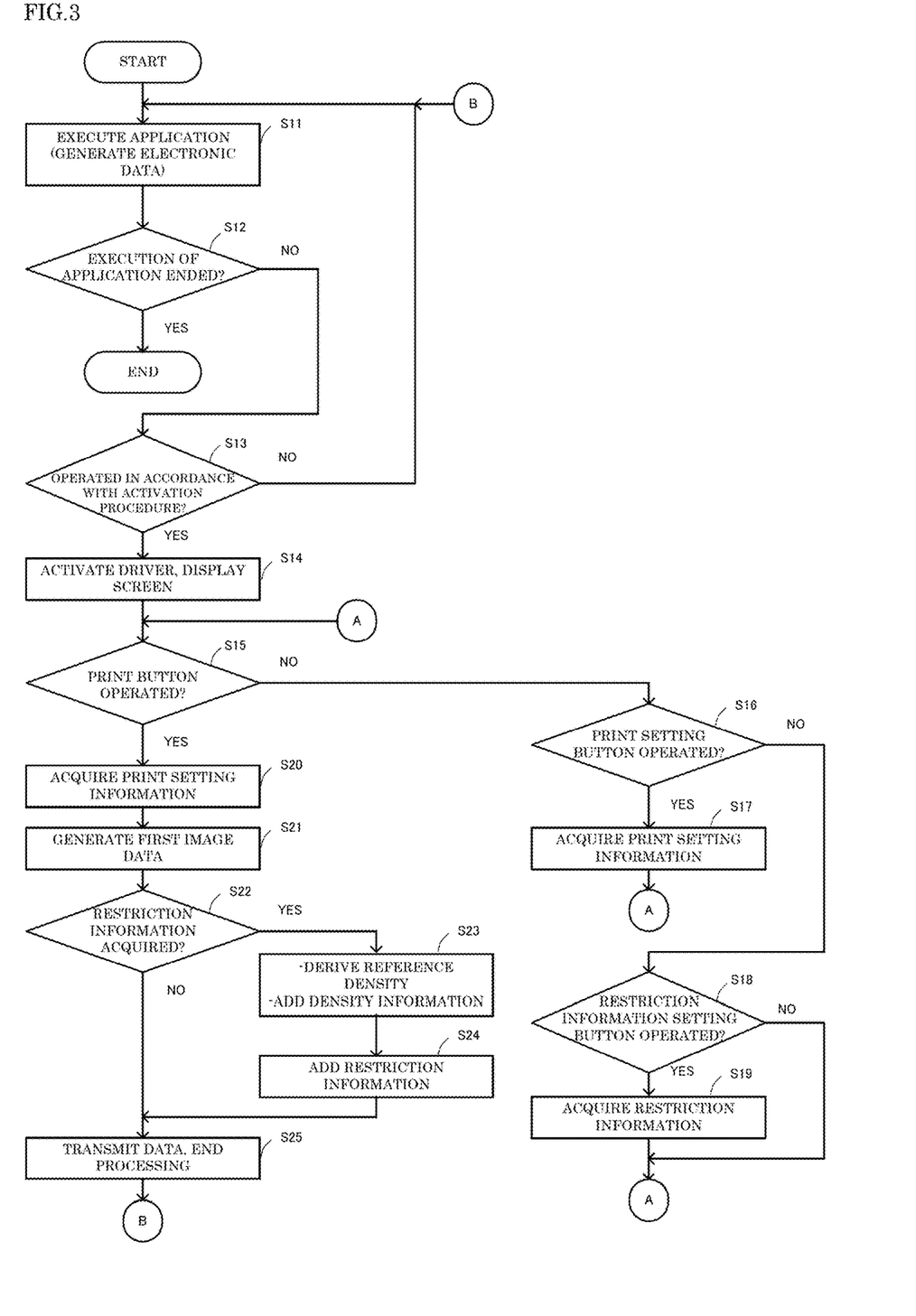
FIG. 3 is a flowchart showing a processing procedure of the information processing apparatus shown in FIG. 2.

In step S11 of FIG. 3, the control portion 13 executes, for example, an application program (hereinafter, merely referred to as an application) for document creation and editing. The application is preliminarily stored in the nonvolatile memory. By executing the application, the control portion 13 generates electronic data that becomes a basis of the first image data GD1 and stores the electronic data in the nonvolatile memory or the RAM (step S11). The electronic data represent the content of the document sheet G1 (see FIG. 5). The content may include a text, a photograph, and a drawing.

Next, the control portion 13 determines whether or not the execution of the application is ended (step S12). Upon determining that the execution of the application is ended (namely, YES in step S12), the control portion 13 ends the execution of the application. On the other hand, upon determining that the execution of the application is not ended (namely, NO in step S12), the control portion 13 moves the process to step S13.

To cause the image forming apparatus 300 to output the document sheet G1 generated based on the first image data GD1, the first operator operates the operation portion 11 in accordance with a predetermined activation procedure of the driver. In step S13, the control portion 13 determines whether or not the operation portion 11 has been operated in accordance with the activation procedure. Upon determining that the operation portion 11 has been operated in accordance with the activation procedure (namely, YES in step S13), the control portion 13 moves the process to step S14. On the other hand, upon determining that the operation portion 11 has not been operated in accordance with the activation procedure (namely, NO in step S13), the control portion 13 returns the process to step S11.

In step S14, the control portion 13 activates the driver, and displays an initial screen on the display portion 12. The initial screen includes a print button, a print setting button, and a restriction information setting button. The print button is operated by the first operator to cause the image forming apparatus 300 to output the document sheet G1. The print setting button is operated by the first operator to perform a setting for the print process (hereinafter referred to as a print setting). The restriction information setting button is operated by the first operator to add restriction information to the document sheet G1.

Next, the control portion 13 determines whether or not the print button has been operated on the operation portion 11 (step S15). Upon determining that the print button has been operated (namely, YES in step S15), the control portion 13 moves the process to step S20 that is described below. On the other hand, upon determining that the print button has not been operated (namely, NO in step S15), the control portion 13 moves the process to step S16.

In step S16, the control portion 13 determines whether or not the print setting button has been operated on the operation portion 11. Upon determining that the print setting button has been operated (namely, YES in step S16), the control portion 13 moves the process to step S17. On the other hand, upon determining that the print setting button has not been operated (namely, NO in step S16), the control portion 13 moves the process to step S18.

In step S17, the control portion 13 acquires print setting information. The print setting information is necessary for generating the first image data GD1 based on the electronic data, and includes a sheet size, a print quality (namely, resolution of the first image data GD1), and a blank size.

Figure 4:
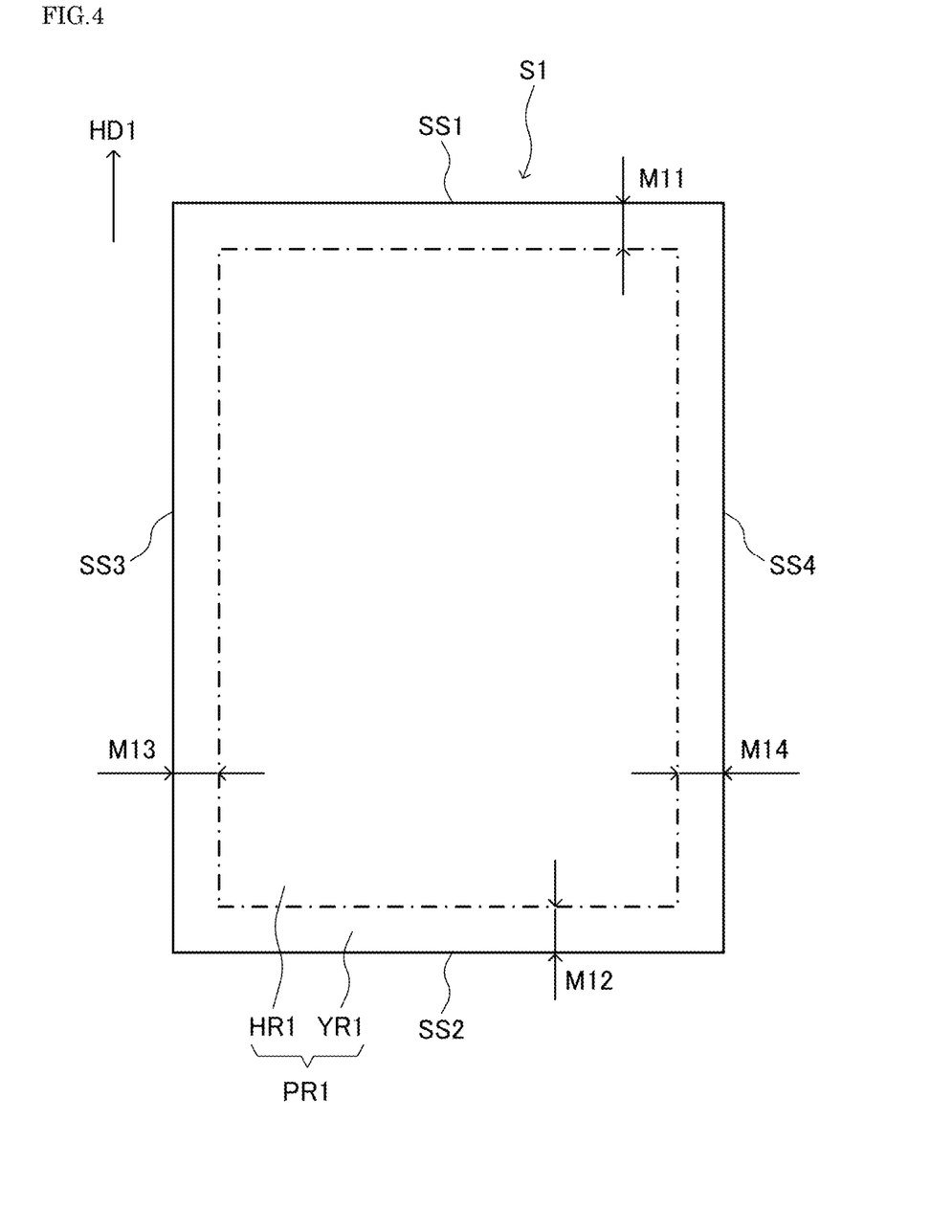
FIG. 4 is a schematic diagram showing a document sheet region of a sheet shown in FIG. 1.

The following describes the sheet size and the blank size with reference to FIG. 4.

FIG. 4 shows the sheet S1. The size (namely, the sheet size) of the sheet S1 conforms to the Japanese Industrial Standards or the like, and is A3, A4, A5, B4, B5 or the like. In addition, the sheet sizes are predefined so that the image forming apparatus 300 can perform the print process.

The image forming apparatus 300 is configured to print an image on a document sheet region PR1 that is predetermined in the sheet S1. The document sheet region PR1 is composed of the whole region of the main surface of the sheet S1. It is noted that some image forming apparatuses 300 are configured not to print an image in the peripheral edge part of the main surface. That is, the document sheet region PR1 is not limited to the whole region of the main surface of the sheet S1, but may be the region of the main surface except for the peripheral edge part.

Specifically, the document sheet region PR1 has a rectangular shape, and has sides SS1 to SS4. The sides SS1 and SS2 respectively correspond to the front end and the rear end of the document sheet region PR1 (sheet S1) in the discharge direction HD1. The sides SS3 and SS4 respectively correspond to the left end and the right end of the document sheet region PR1 (sheet S1) toward the discharge direction HD1.

The document sheet region PR1 includes an arrangement region HR1 (a region surrounded by a dot chain line in FIG. 4) and a blank region YR1.

The arrangement region HR1 is a region in which the content of the document sheet G1 is arranged. Here, the blank size includes a first blank size M11, a second blank size M12, a third blank size M13, and a fourth blank size M14. The first blank size M11 and the second blank size M12 are sizes of blanks that are provided respectively on the front side and the rear side of the document sheet region PR1 (sheet S1) in the discharge direction HD1. In addition, the third blank size M13 and the fourth blank size M14 are sizes of blanks that are provided respectively on the left side and the right side of the document sheet region PR1 (sheet S1) toward the discharge direction HD1.

It is noted that each of the first blank size M11 to the fourth blank size M14 may be larger than the size of each side of first specific regions TR1 that are described below.

The arrangement region HR1 is a rectangular region that is separated from the sides SS1, SS2, SS3, and SS4 of the document sheet region PR1 respectively by the first blank size M11, the second blank size M12, the third blank size M13, and the fourth blank size M14.

The blank region YR1 is a blank region in the document sheet G1, and is a peripheral edge part of the document sheet region PR1. Specifically, the blank region YR1 is a region in the document sheet region PR1 except for the arrangement region HR1.

Next, step S17 is described in detail. The control portion 13 displays a first setting screen. The first setting screen is configured such that the first operator can set the sheet size, the print quality, and the blank size by operating the operation portion 11. In addition, the first setting screen provides a pull-down menu or the like so that lists of print qualities and sheet sizes are displayed in such a manner that selection can be made by the first operator. The control portion 13 stores, as the print setting information, the first blank size M11 to the fourth blank size M14 that have been input to the first setting screen, and the print quality and the sheet size selected on the first setting screen, into the RAM or the like (step S17). Thereafter, the control portion 13 returns the process to step S15.

The first operator may desire to restrict a specific process (for example, the copy process) from being performed on the document sheet G1 by the image forming apparatus 300. There is known a conventional technology that adds restriction information to the periphery of the document sheet represented by the image data, wherein the restriction information indicates, by a specific sign, that the specific process is restricted (for example, the copy process is prohibited). It is desirable that the restriction information is inconspicuous, but whether or not the restriction information is inconspicuous depends on the density of the other information in the document sheet. In the information processing system 100 of the present embodiment, the information processing apparatus 200 executes steps S18, S19, and S22 to S24 to restrict the specific process from being performed by the image forming apparatus 300.

In step S18, the second drive roller 13 determines whether or not the restriction information setting button has been operated on the operation portion 11. Upon determining that the restriction information setting button has been operated (namely, YES in step S18), the control portion 13 moves the process to step S19. On the other hand, upon determining that the restriction information setting button has not been operated (namely, NO in step S18), the control portion 13 returns the process to step S15.

In step S19, the control portion 13 acquires a piece of restriction information LD1 that is to be added to the first image data GD1. Specifically, the control portion 13 displays a second setting screen. The second setting screen is configured such that the first operator can select a piece of restriction information LD1 (see FIG. 5) by operating the operation portion 11. In addition, the second setting screen provides a pull-down menu or the like so that lists of pieces of restriction information LD1 are displayed in such a manner that selection can be made by the first operator. The restriction information LD1 indicates, by a character sequence or a mark, that the specific process is restricted (for example, the copy process is prohibited). The character sequence is, for example, "copy prohibited" (see FIG. 5), or "prohibited copying". The first operator selects a piece of restriction information LD1 on the second setting screen by operating the operation portion 11. The control portion 13 stores the piece of restriction information LD1 selected by the first operator, in the RAM or the like (step S19).

In step S20, the control portion 13 acquires the print setting information that was stored in the RAM in step S17. It is noted that when the print setting information is not stored in the RAM, the control portion 13 acquires a predetermined default value for each of the sheet size, the print quality, and the blank size.

Next, the control portion 13 generates the first image data GD1 based on the electronic data (step S21). The first image data GD1 represents the document sheet G1 (see FIG. 5) by a plurality of pixels. The plurality of pixels are arranged in a lattice shape, having a predetermined number of pixels in each of a first direction FD 1 and a second direction SD2. The first direction FD1 and the second direction SD2 extend respectively along the side SS2 and the side SS3 of the document sheet region PR1.

Specifically, in step S21, the control portion 13 derives the predetermined number of pixels from the resolution and the sheet size included in the print setting information acquired in step S17. The control portion 13 further generates the first image data GD1 representing the document sheet G1 by assigning density to each of the plurality of pixels based on the electronic data (step S21). More specifically, a density is assigned to each of the plurality of pixels included in the arrangement region HR1 (see FIG. 5) to represent the content of the document sheet G1. The density of each pixel has a value in a predetermined numeral range. A plurality of pixels included in the blank region YR1 are assigned with a lower-limit density (namely, a density representing white) that is the lowest value in the numeral range of the density. It is noted that the highest density in the numeral range of the density is referred to as an upper-limit density. When the content of the document sheet G1 is a monochrome image, the density is a grayscale gradation value. In addition, when the content of the document sheet G1 is a color image, the density includes densities of red, green, and blue.

Next, the control portion 13 determines whether or not the restriction information LD1 has been acquired (step S22). Specifically, upon determining that the restriction information LD1 has been acquired (namely, YES in step S22), the control portion 13 moves the process to step S23. On the other hand, upon determining that the restriction information LD1 has not been acquired (namely, NO in step S22), the control portion 13 moves the process to step S25.

In step S23, the control portion 13 functions as the first addition processing portion 13A. The first addition processing portion 13A adds density information DD1 to first specific regions TR1 of the document sheet G1 represented by the first image data GD1, the density information DD1 being indicated by a reference density that is lower than a density index value that is derived based on the densities of the pixels included in the first image data GD1. It is noted that the first image data GD1 corresponds to a piece of image data in the present disclosure.

Specifically, the control portion 13 derives the density index value from the densities of pixels included in the arrangement region HR1 (see FIG. 5) in the first image data GD1. The density index value is an average value or a central value of densities of all pixels included in the arrangement region HR1.

The control portion 13 further adds density information DD1 to four first specific regions TR1 that are predetermined in the document sheet G1 represented by the first image data GD1, the density information DD1 being indicated by a reference density that is lower than the density index value and higher than the lower-limit density (step S23). It is noted that the number of the first specific regions TR1 may be one or more.

Figure 5:
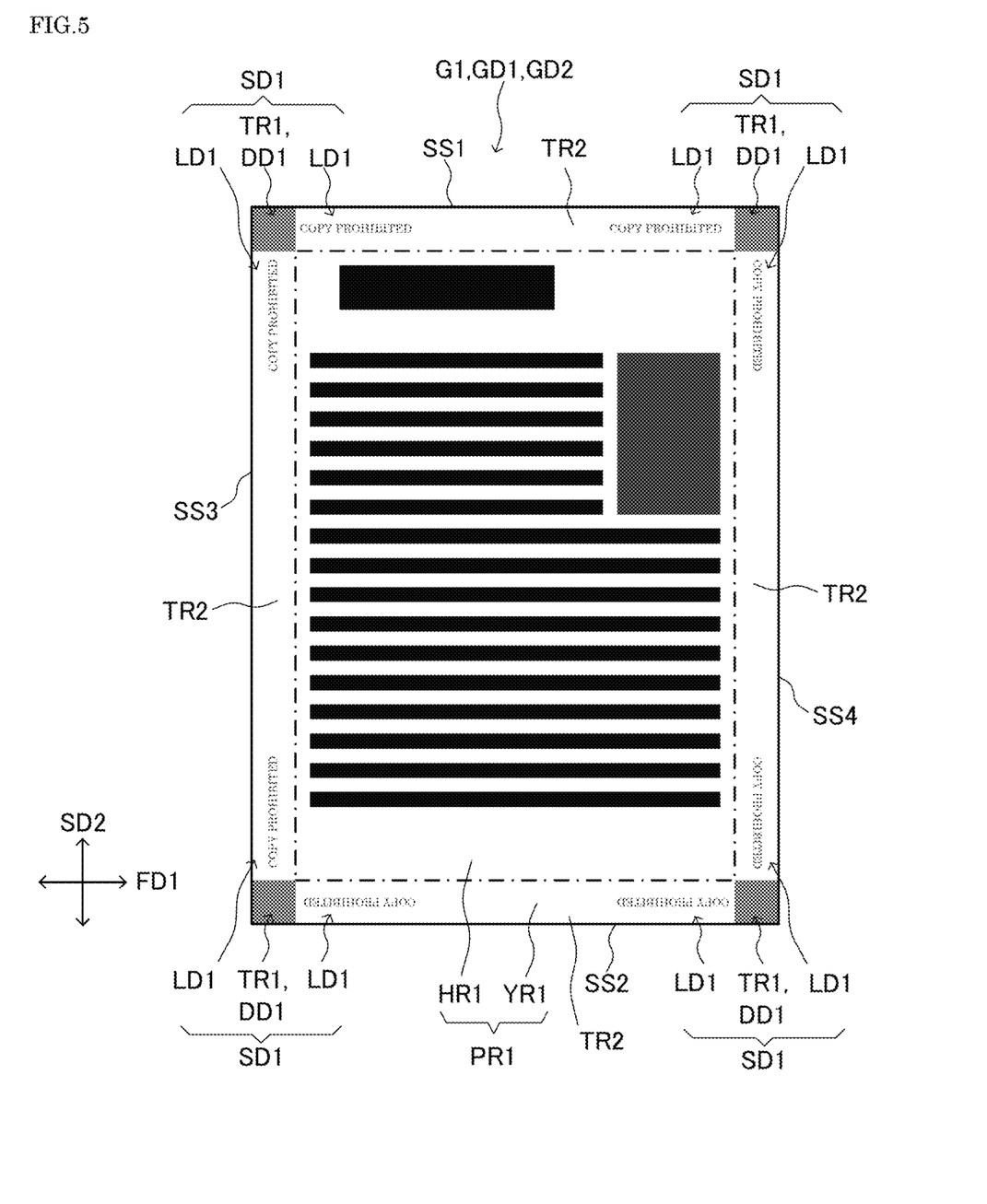
FIG. 5 is a schematic diagram showing a document sheet represented by first image data shown in FIG. 1.

More specifically, as shown in FIG. 5, the first specific regions TR1 are provided in the blank region YR1. The first specific regions TR1 are regions that include pixels corresponding to apexes (namely, corners) of the document sheet region PR1 in the blank region YR1. The first specific regions TR1 each have a square shape of the same size and have sides of the same length that extend along the first direction FD 1 and the second direction SD2. As described above, each of the first blank size M11 to the fourth blank size M14 is larger than the length of each side of the first specific regions TR1. This prevents each piece of the density information DD1 from overlapping the arrangement region HR1 (namely, the content of the document sheet G1).

The control portion 13, in the first image data GD1, replaces each of the densities of the plurality of pixels included in the first specific regions TR1 with the reference density. This allows the density information DD1 which is a solid image being indicated by the reference density, to be added to each of the first specific regions TR1.

In step S24, the control portion 13 functions as the second addition processing portion 13B, and adds the restriction information LD1 to the first image data GD1, the restriction information LD1 being indicated by a density that is equal to or higher than the reference density.

Specifically, the control portion 13 adds the piece of restriction information LD1 selected in step S19 to each of second specific regions TR2 (step S24). The second specific regions TR2 are respectively located on the first direction FD 1 side and the second direction SD2 side of the first specific regions TR1 in the blank region YR1. Specifically, each of the second specific regions TR2 is located between two first specific regions TR1 that are adjacent to each other in the first direction FD 1 or the second direction SD2 in the blank region YR1. In other words, the second specific regions TR2 are provided on a plurality of locations that are separated from each other on the document sheet G1. Thereafter, the control portion 13 moves the process to step S25. It is noted that it suffices that at least one piece of restriction information LD1 is added to the second specific regions TR2.

Specifically, a plurality of pieces of restriction information LD1 are preliminarily stored in, for example, the nonvolatile memory so that selection can be made by the first operator. As shown in FIG. 5, in the restriction information LD1, each of the specific signs has a size (namely, vertical width) that is smaller than the length of each side of the density information DD1. In step S24, the control portion 13 acquires the piece of restriction information LD1 selected in step S19, from the nonvolatile memory.

In step S24, the control portion 13 further sets the density of the restriction information LD1 (namely, a character sequence or a mark) to a density that is equal to or higher than the reference density and lower than the maximum density. Here, the maximum density is the highest density among the densities of all pixels included in the arrangement region HR1. In each of the second specific regions TR2, the control portion 13 adds the restriction information LD1 to pixel regions that are respectively separated from the first specific regions TR1 by a predetermined distance in the first direction FD 1 and the second direction SD2.

More specifically, each piece of the restriction information LD1 is combined to align in the first direction FD 1 or the second direction SD2 in each of the second specific regions TR2. In other words, a plurality of pieces of restriction information LD1 are added to the second specific regions TR2 that are provided in the plurality of locations. In addition, each piece of the restriction information LD1 is combined such that lower ends of the restriction information LD1 (specifically, characters constituting "COPY PROHIBITED") align along the outer peripheral of the arrangement region HR1. In other words, a plurality of pieces of restriction information LD1 are reverse to each other in a plurality of second specific regions TR2 that align in at least one of the first direction FD 1 and the second direction SD2.

With the above-described configuration where densities are assigned to the density information DD1 and the restriction information LD1 as described above, the control portion 13 can generate the first image data GD1 in which the density information DD1 and the restriction information LD1 that are inconspicuous to the content of the document sheet G1 in the arrangement region HR1, have been added to the second specific regions TR2.

In step S25, the control portion 13 transmits data to the image forming apparatus 300 via the communication network 400 (see FIG. 2). Thereafter, the control portion 13 returns the process to step S11.

It is noted that in steps S23 and S24, the control portion 13 combines the density information DD1 and the restriction information LD1 with the blank region YR1 set in step S17. However, not limited to this, even when each of the first blank size M11 to the fourth blank size M14 has been set to 0 (zero) in step S17, the control portion 13 can add the density information DD1 and the restriction information LD1 to the first image data GD1. In addition, in a case where the whole region of the document sheet region PR1 is the arrangement region HR1, the control portion 13 can add the density information DD1 and the restriction information LD1 to the first image data GD1.

Specifically, in step S23, the control portion 13 derives the density index value, and then adds the density information DD1 to each of the first specific regions TR1 that include a plurality of pixels corresponding to the apexes (namely, corners) of the document sheet region PR1.

In addition, in step S24, the control portion 13 replaces each of the densities of the plurality of pixels included in the second specific regions TR2 that are, in the arrangement region HR1, respectively located on the first direction FD 1 side and the second direction SD2 side of the first specific regions TR1, with the lower-limit density. Thereafter, the control portion 13 adds one or more pieces of restriction information LD1 to each of the second specific regions TR2.

Next, the configuration of the image forming apparatus 300 is described in detail with reference to FIG. 6.

The image forming apparatus 300 includes the image forming portion 21, the discharge portion 22, the image reading portion 23, the operation/display portion 24, and an information processing apparatus 25.

The image forming portion 21 forms an image on the sheet S1 based on the first image data GD1 transmitted from the information processing apparatus 25, and discharges the sheet S1 to the discharge portion 22 as the document sheet G1. The image forming portion 21 forms an image on another sheet S1 based on the second image data GD2 transmitted from the information processing apparatus 25, and discharges the other sheet S1 to the discharge portion 22 as the copy G2 of the document sheet G1. It is noted that the image formation method may be an electrophotographic method or an inkjet method. In a case where the electrophotographic method is adopted, the image reading portion 23 includes a photoconductor drum, a charger, an exposure device, a developing device, a transfer device, and a fixing device.

The image reading portion 23 includes a document sheet table glass, a document sheet cover, a light source, a mirror, an optical lens, and a CCD (Charge Coupled Device). On the document sheet table glass, the document sheet G1 is placed by an operator (hereinafter referred to as a second operator) of the image forming apparatus 300, and then the document sheet G1 is covered with the document sheet cover. The image reading portion 23 optically reads the document sheet G1 on platen glass or the document sheet table glass, and outputs the second image data GD2 that represents the document sheet G1, to the information processing apparatus 25.

The operation/display portion 24 includes a display portion and an operation portion. The display portion is, for example, a liquid crystal display and displays information. The operation portion is composed of, for example, a touch panel and operation keys through which information is received in response to operations of the second operator.

The information processing apparatus 25 includes a CPU, a ROM, a RAM, and a nonvolatile memory. It is noted that the information processing apparatus 25 may be an electronic circuit such as an ASIC (Application Specific Integrated Circuit) or a DSP (Digital Signal Processor). The information processing apparatus 25 includes a density acquiring portion 25A, a determination processing portion 25B, and a restriction processing portion 25C. Specifically, in the information processing apparatus 25, the CPU executes a control program stored in the ROM or the like, by using the main memory as a working area. This allows the information processing apparatus 25 to function as the density acquiring portion 25A, the determination processing portion 25B, and the restriction processing portion 25C.

It is noted that the density acquiring portion 25A, the determination processing portion 25B, and the restriction processing portion 25C may be implemented by one or more CPUs, or may be implemented by one or more electronic circuits.

Figure 6:
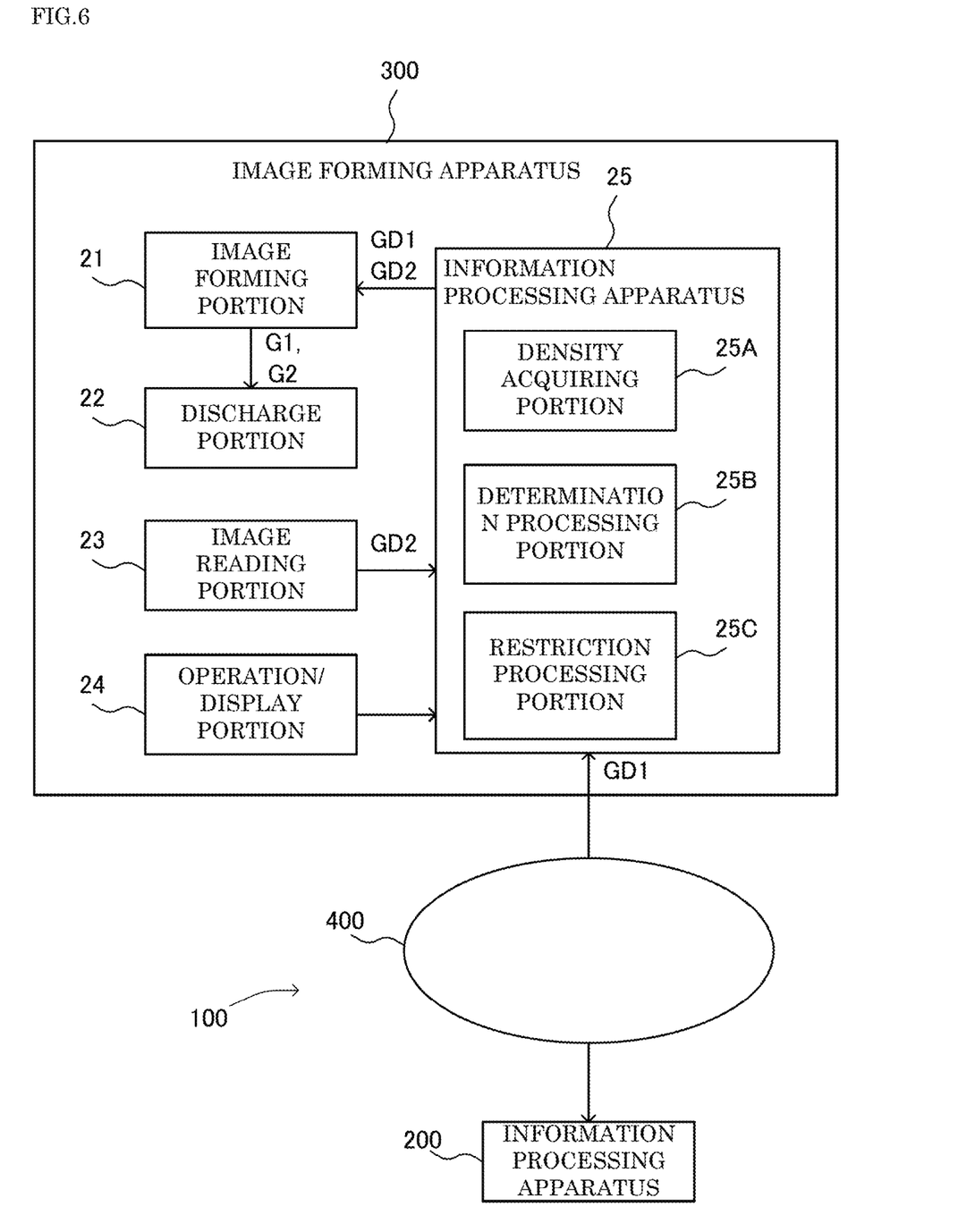
FIG. 6 is a block diagram showing a configuration of an image forming apparatus shown in FIG. 1.
Figure 7:
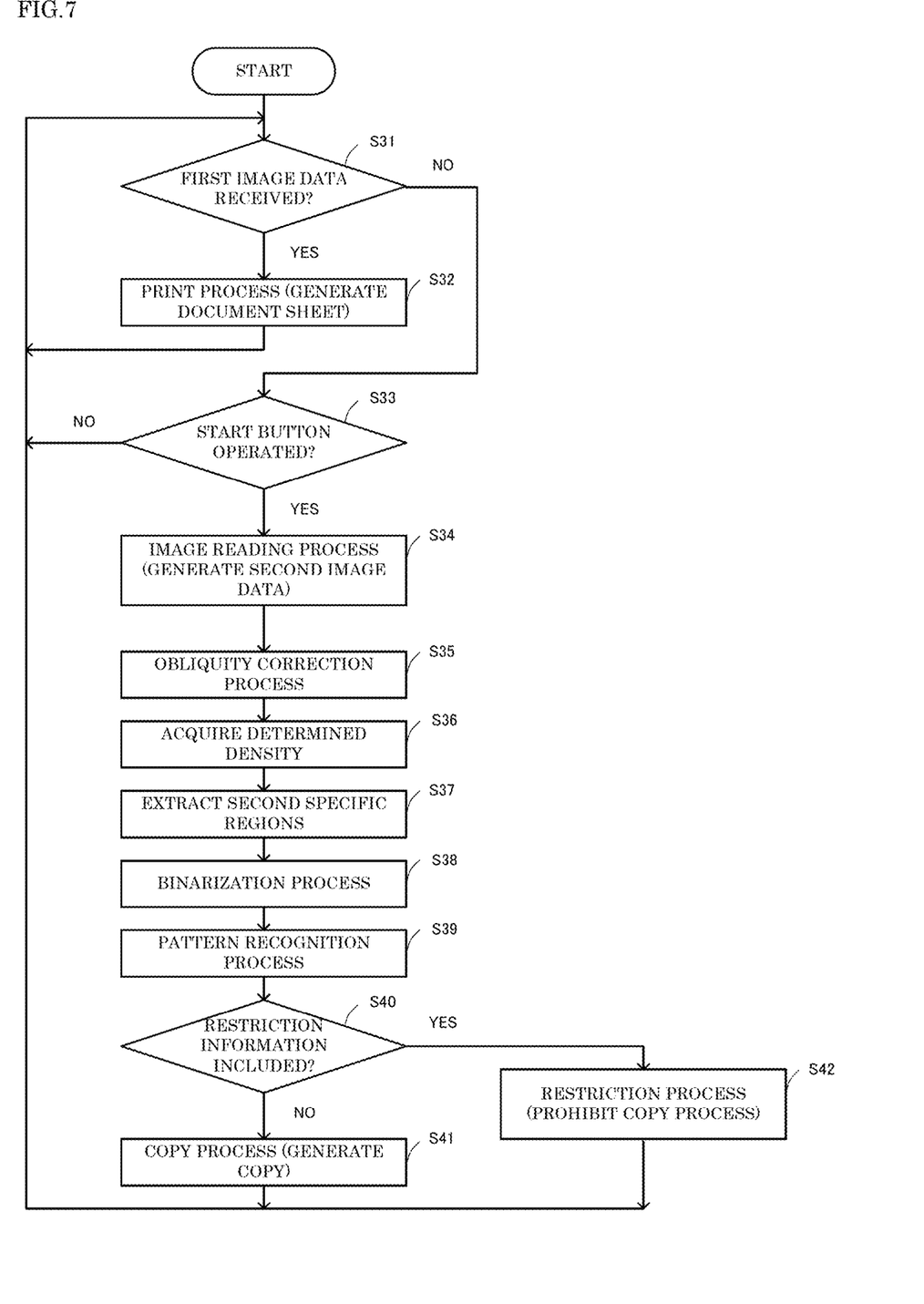
FIG. 7 is a flowchart showing a processing procedure of the image forming apparatus shown in FIG. 6.

The following describes a specific example of the process of the information processing apparatus 25 with reference to FIG. 6 and FIG. 7.

In step S31 of FIG. 7, the information processing apparatus 25 determines whether or not the first image data GD1 has been received from the information processing apparatus 200. Upon determining that the first image data GD1 has been received (namely, YES in step S31), the information processing apparatus 25 moves the process to step S32 to perform the print process. On the other hand, upon determining that the first image data GD1 has not been received (namely, NO in step S31), the information processing apparatus 25 moves the process to step S33.

In step S32, the information processing apparatus 25 executes the print process. That is, the information processing apparatus 25 controls the operation of the image forming portion 21 and transmits the first image data GD1 to the image forming portion 21. Following this, the image forming portion 21 forms an image on the sheet S1 based on the first image data GD1, and discharges the sheet S1 to the discharge portion 22 as the document sheet G1 (step S32). Thereafter, the information processing apparatus 25 returns the process to step S31. Execution of step S32 allows the first operator to acquire the document sheet G1.

In addition, when the operator of the image forming apparatus 300 (hereinafter, the second operator) intends to acquire the copy G2 of the document sheet G1 using the image forming apparatus 300, the second operator sets the document sheet G1 on the image reading portion 23, and operates the start button provided on the operation/display portion 24.

In step S33 of FIG. 7, the information processing apparatus 25 determines whether or not the start button has been operated. Upon determining that the start button has not been operated (namely, NO in step S33), the information processing apparatus 25 returns the process to step S31. On the other hand, upon determining that the start button has been operated, the information processing apparatus 25 moves the process to step S34.

In step S34, the information processing apparatus 25 performs the image reading process. Specifically, the information processing apparatus 25 controls the operation of the image reading portion 23. The image reading portion 23 optically reads the document sheet G1 set in the image reading portion 23 itself, generates the second image data GD2 representing the document sheet G1 (see FIG. 5), and transmits the second image data GD2 to the information processing apparatus 25. This allows the information processing apparatus 25 to acquire the second image data GD2 (step S34). The second image data GD2 resembles to the first image data GD1, and represents the document sheet G1 (see FIG. 5) by a plurality of pixels that are arranged in a lattice shape.

There may be a case where the document sheet G1 is placed obliquely on the document sheet table glass. For this reason, after step S34, the information processing apparatus 25 executes an obliquity correction process to the second image data GD2 to correct the obliquity of the document sheet region PR1 in the second image data GD2 (step S35). This makes it possible to improve the accuracy in recognizing the restriction information LD1 during a pattern recognition process that is described below.

The program or the nonvolatile memory of the information processing apparatus 25 preliminarily stores: information indicating that the first specific regions TR1 are square regions including apexes of the document sheet region PR1 of the document sheet G1; and the length of each side of the first specific regions TR1.

After step S35, the information processing apparatus 25 functions as the density acquiring portion 25A, and acquires, as a determined density, a density of the first specific regions TR1 in the document sheet G1 represented by the second image data GD2 (step S36).

Specifically, the information processing apparatus 25 extracts, as the first specific regions TR1 (see FIG. 5), pixel regions that are identified by the apexes of the document sheet region PR1 and the length of each side, from the second image data GD2. The information processing apparatus 25 further acquires, as the determined density, a density of a plurality of pixels included in the first specific regions TR1 (step S36). It is noted that the plurality of pixels included in the first specific regions TR1 have the same density. Accordingly, the information processing apparatus 25 can easily acquire the determined density.

Next, the information processing apparatus 25 extracts, as the second specific regions TR2 (see FIG. 5), pixel regions that are each arranged between two first specific regions TR1 located along a side of the document sheet region PR1, from the second image data GD2 (step S37). The second specific regions TR2 correspond to a part of a region of a document sheet of the present disclosure.

In steps S38 to S40, the information processing apparatus 25 functions as the determination processing portion 25B. That is, the information processing apparatus 25 determines based on the second image data GD2 whether or not the second specific regions TR2 that are a part or all of the region of the document sheet G1, include the restriction information LD1 which is indicated by a density that is equal to or higher than the determined density. The second image data GD2 is another piece of image data in the present disclosure.

In step S38, the information processing apparatus 25 executes a binarization process. In the binarization process, the information processing apparatus 25 generates binarized image data by binarizing the densities of the pixels of the second specific regions TR2 with the determined density. Specifically, in the second specific regions TR2, each pixel which is indicated by a density that is lower than the determined density is replaced with the lower-limit density. On the other hand, each pixel which is indicated by a density that is equal to or higher than the determined density is replaced with the upper-limit density.

In the information processing apparatus 25, the nonvolatile memory or the like preliminarily stores the restriction information LD1 that can be used on the information processing apparatus 200 side. After step S38, the information processing apparatus 25 executes a pattern recognition process such as a character recognition process on each piece of the binarized data (step S39). Thereafter, the information processing apparatus 25 determines, based on the binarized data, whether or not any one of the second specific regions TR2 includes the restriction information LD1 (step S40). Upon determining that the binarized data does not include the restriction information LD1 (namely, NO in step S40), the information processing apparatus 25 moves the process to step S41. On the other hand, upon determining that the binarized data includes the restriction information LD1 (namely, YES in step S40), the information processing apparatus 25 moves the process to step S42.

Here, there is no knowing in what orientation the document sheet G1 will be placed on the document sheet table glass by the second operator. However, a plurality of pieces of restriction information LD1 are added to the second specific regions TR2 that are provided in the plurality of locations. In addition, the plurality of pieces of restriction information LD1 are reverse to each other in the plurality of second specific regions TR2 that align in at least one of the first direction FD 1 and the second direction SD2. With this configuration, it is possible to improve the accuracy in recognizing the restriction information LD1.

In addition, the binarization process and the pattern recognition process are executed on the second specific regions TR2 that are a partial region of the document sheet region PR1, not on the document sheet region PR1. This reduces the time taken for the binarization process and the pattern recognition process. It is noted that in steps S38 to S40, the information processing apparatus 25 may execute the binarization process and the pattern recognition process by regarding the whole region of the document sheet region PR1 (namely, the document sheet G1) as the second specific regions TR2. In this case, the information processing apparatus 25 determines whether or not the whole region of the document sheet G1 (as the second specific regions TR2) includes the restriction information LD1.

In step S41, the information processing apparatus 25 executes the copy process to control the operation of the image forming portion 21 and transmit the second image data GD2 to the image forming portion 21. As a result, the image forming portion 21 forms an image on the sheet S1 based on the second image data GD2 and discharges the sheet S1 to the discharge portion 22 as the copy G2 of the document sheet G1. Thereafter, the information processing apparatus 25 returns the process to step S31. Execution of step S32 allows the second operator to obtain the copy G2 of the document sheet G1.

According to the present embodiment, in the information processing system 100, the information processing apparatus 200 can add, to the first image data GD1, the restriction information LD1 that is inconspicuous to the document sheet G1. In addition, in the information processing system 100, the image forming apparatus 300 can restrict the specific process from being performed on the second image data GD2 representing the document sheet G1, by using the inconspicuous restriction information LD1.

In addition, according to the present embodiment, the information processing apparatus 200 adds the density information DD1 which is indicated by the reference density, and the restriction information LD1 which is indicated by a density that is equal to or higher than the reference density, to the first image data GD1. As a result, it is possible to prevent an erroneous recognition of the restriction information LD1 during the pattern recognition process. In general, in the image forming apparatus 300, the density of the second image data GD2 acquired by the image reading process can be set by the second operator. As a result, there may be a case where the second operator sets the density of the restriction information LD1 in the second image data GD2 to a low density. In such a situation, when the densities of the pixels of the second specific regions TR2 are binarized with a fixed determined density preset in the information processing apparatus 25, the densities of the pixels may be replaced with a density that is lower than the lower-limit density. When this happens, the information processing apparatus 25 erroneously determines that the restriction information LD1 is not included in the second specific regions TR2. On the other hand, in the present embodiment, the density information DD1 and the restriction information LD1 are added to the second image data GD2. As a result, even if the second operator has set the density with regard to the image reading process, it is possible to prevent the density of the restriction information LD1 in the second specific regions TR2 from being replaced with a density that is lower than the determined density. This makes it possible to prevent an erroneous recognition of the restriction information LD1 during the pattern recognition process.

In step S42, the information processing apparatus 25 functions as the restriction processing portion 25C. The information processing apparatus 25 restricts the specific process (namely, the copy process) from being executed on the second image data GD2. Specifically, the information processing apparatus 25 does not start an operation of the image forming portion 21. In addition, the information processing apparatus 25 does not transmit the second image data GD2 to the image forming portion 21. That is, the information processing apparatus 25 restricts the copy process of copying the document sheet G1. The information processing apparatus 25 further displays notification data on the operation/display portion 24, wherein the notification data indicates that the specific process on the document sheet G1 is restricted. After step S42, the information processing apparatus 25 returns the process to step S31. It is noted that the specific process is not limited to the copy process, but may be a reservation process of reserving the second image data GD2 in the nonvolatile memory of the information processing apparatus 25. Furthermore, the specific process may be a transmission process of transmitting a facsimile based on the second image data GD2.

Modification

Next, a modification of the embodiment is described. It is noted that in the modification, the same configurations and steps as those of the above-described embodiment are assigned the same reference numbers and step numbers, and description thereof is omitted.

Figure 8:
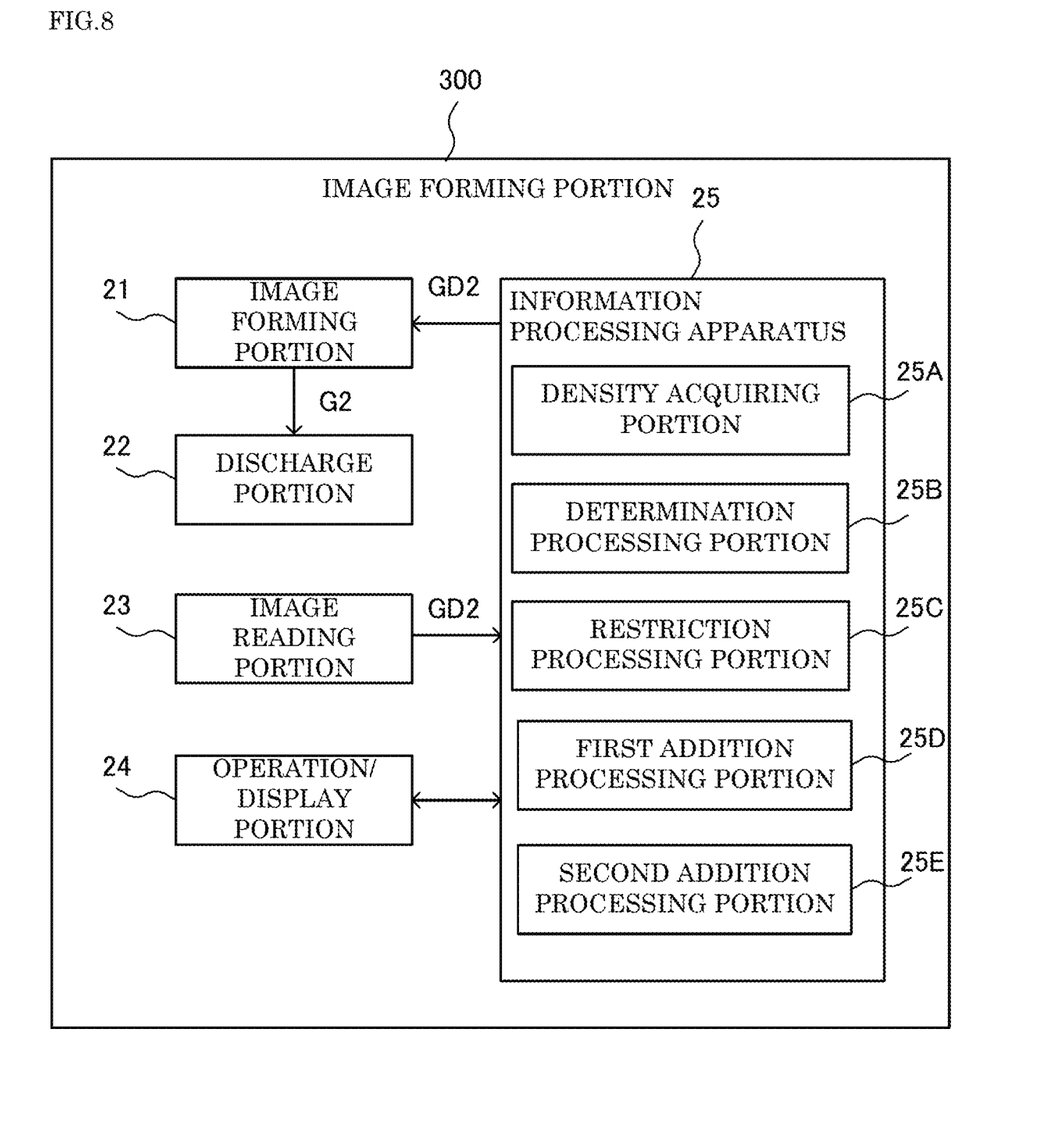
FIG. 8 is a diagram showing a configuration of an image forming apparatus according to a modification.

In FIG. 8, the image forming apparatus 300 is, for example, a copier, and is configured to execute the print process and the copy process. It is noted that the image forming apparatus 300 is an example of an information processing system of the present disclosure.

In the image forming apparatus 300, the information processing apparatus 25 includes, in addition to the density acquiring portion 25A, the determination processing portion 25B, and the restriction processing portion 25C, a first addition processing portion 25D and a second addition processing portion 25E. Specifically, when the CPU executes the control program, the information processing apparatus 25 functions as the first addition processing portion 25D and the second addition processing portion 25E.

Figure 9A:
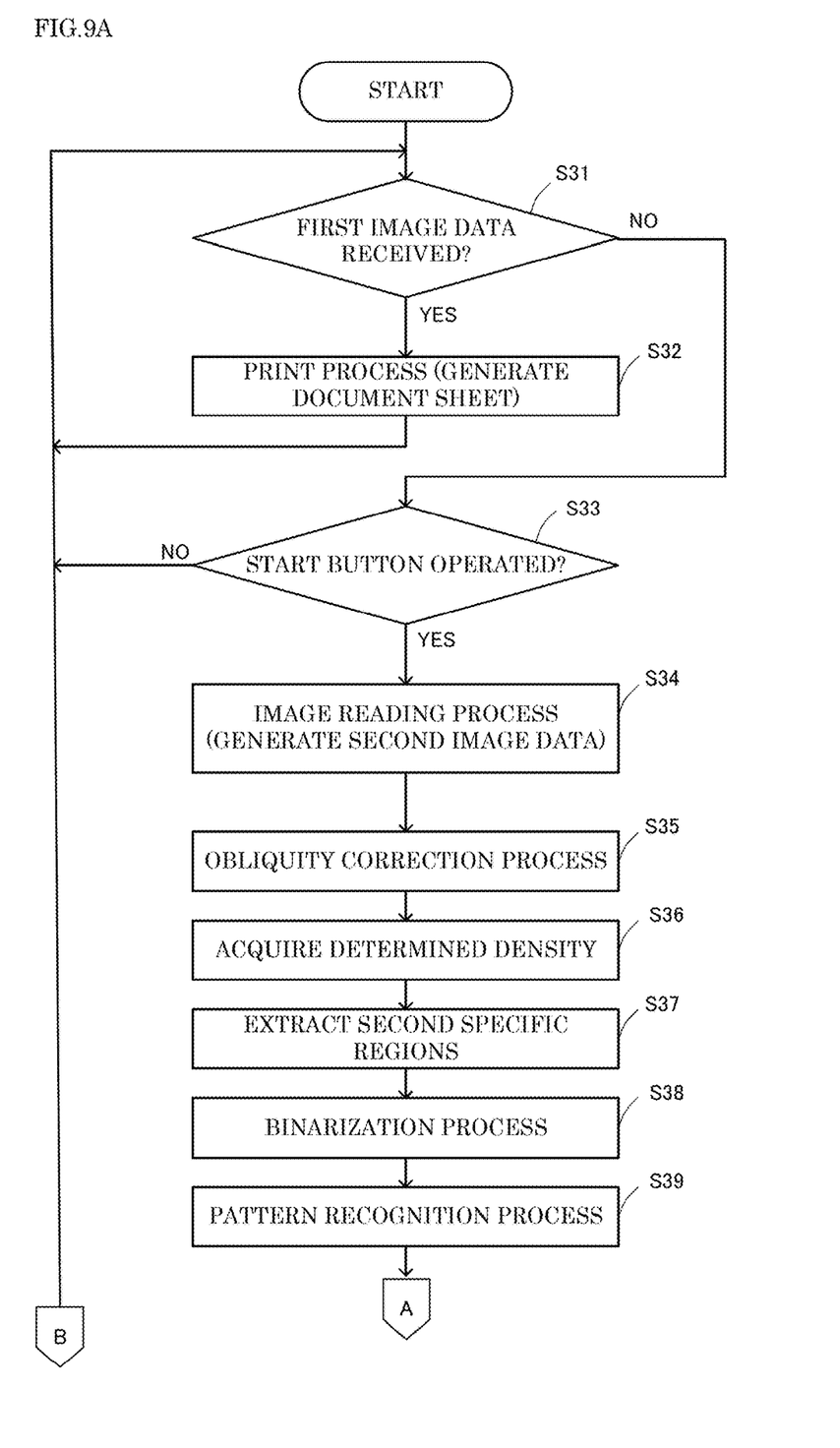
FIG. 9A is a flowchart showing a first half of a processing procedure of the image forming apparatus shown in FIG. 8.
Figure 9B:
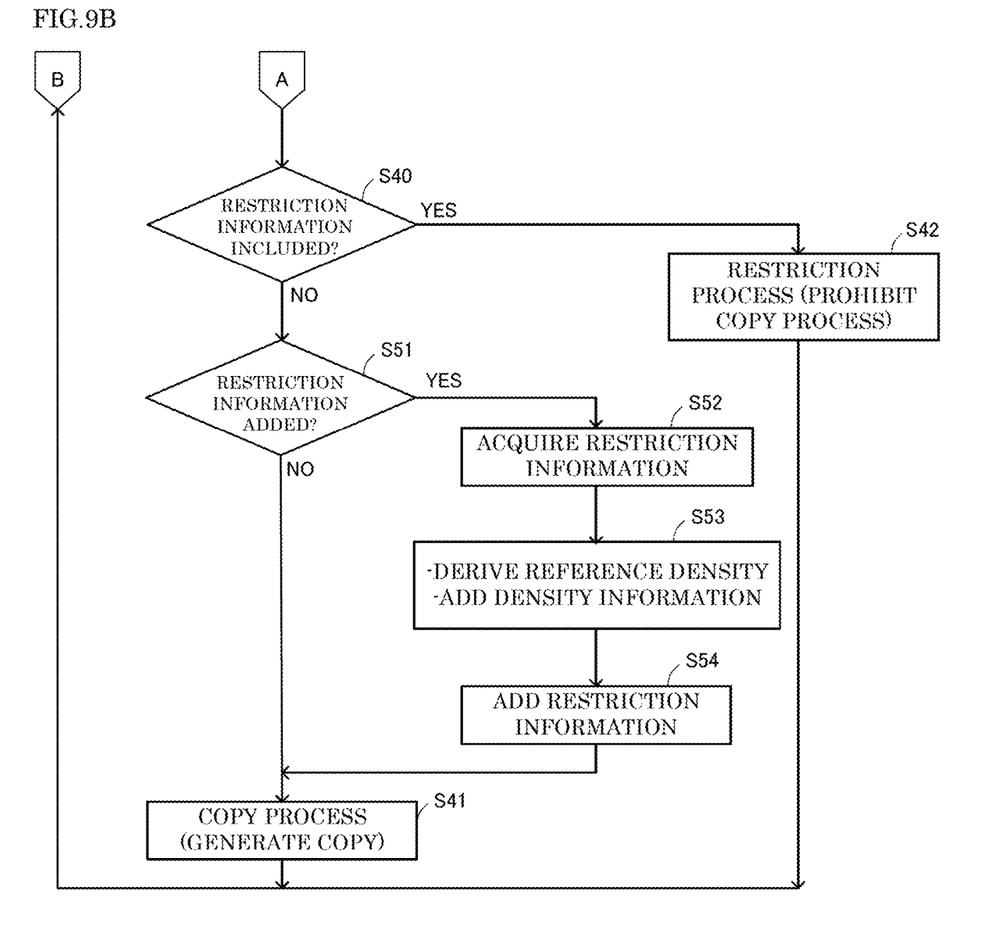
FIG. 9B is a flowchart showing a second half of the processing procedure of the image forming apparatus shown in FIG. 8.

The following describes the process of the information processing apparatus 25 in detail with reference to FIG. 8, FIG. 9A, and FIG. 9B.

The second operator places the document sheet G1 on the document sheet table glass. The density information DD1 and the restriction information LD1 may have been added or may not have been added to the document sheet G1.

After step S40 of FIG. 9B, the information processing apparatus 25 determines whether or not to add the density information DD1 and the restriction information LD1 to the document sheet G1 (step S51). Specifically, the information processing apparatus 25 displays a confirmation screen. The confirmation screen allows the second operator to select whether or not to add the density information DD1 and the restriction information LD1 to the second image data GD2, by operating the operation/display portion 24. Upon determining, based on the selection result of the second operator, not to add the density information DD1 and the restriction information LD1 (namely, NO in step S51), the information processing apparatus 25 moves the process to step S41. On the other hand, upon determining, based on the selection result of the second operator, to add the density information DD1 and the restriction information LD1 (namely, YES in step S51), the information processing apparatus 25 moves the process to step S52.

In step S52, the information processing apparatus 25 acquires the restriction information LD1 that is to be added to the second image data GD2. It is noted that step S52 is performed in the same manner as step S19 except that the performers of the steps are different. Thus a detailed description of step S52 is omitted.

Subsequently, the information processing apparatus 25 functions as the first addition processing portion 25D. The information processing apparatus 25 adds the density information DD1 to the first specific regions TR1 of the document sheet G1 represented by the second image data GD2, the density information DD1 being indicated by the reference density that is lower than the density index value that is derived based on the densities of the pixels included in the second image data GD2 (step S53). The information processing apparatus 25 further adds the density information DD1 being indicated by the reference density to the first specific regions TR1 of the document sheet G1 represented by the second image data GD2 (step S53). It is noted that the second image data GD2 corresponds to a piece of image data of the present disclosure.

Subsequently, the information processing apparatus 25 functions as the second addition processing portion 25E and adds the restriction information LD1 acquired in step S52 to the second specific regions TR2 (step S54). Thereafter, the information processing apparatus 25 moves the process to step S41.

It is noted that steps S53 and S54 are performed in the same manner as steps S23 and S24 (see FIG. 3) except that the processing objects of the steps are different. Thus a detailed description of steps S53 and S54 is omitted.

According to the above-described modification, the image forming apparatus 300 alone can add the inconspicuous restriction information LD1 to the document sheet G1, and restrict a process from being performed on the second image data GD2 representing the document sheet G1, by using the inconspicuous restriction information LD1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing system comprising:
   a first addition processing portion configured to add density information to a first specific region that is provided in a blank region that is a peripheral edge part of a document sheet region of a document sheet represented by image data, the density information being indicated by a reference density that is lower than a density index value that is derived based on densities of pixels included in the image data;
   a second addition processing portion configured to add predetermined restriction information to the image data, the restriction information being indicated by a density that is equal to or higher than the reference density;
   a density acquiring portion configured to acquire, as a determined density, a density of the first specific region in the document sheet represented by the image data;
   a determination processing portion configured to determine, based on the image data, whether or not a second specific region that is a part or all of a region of the document sheet, includes the restriction information which is indicated by a density that is equal to or higher than the determined density; and
   a restriction processing portion configured to, when the determination processing portion determines that the second specific region includes the restriction information, restrict a specific process concerning the image data from being executed.

2. An information processing apparatus comprising:
   a density acquiring portion configured to acquire, as a determined density, a density of a first specific region that is provided in a blank region that is a peripheral edge part of a document sheet region of a document sheet represented by image data, the density information being indicated by a reference density that is lower than a density index value that is derived based on densities of pixels included in the image data;
   a determination processing portion configured to determine, based on the image data, whether or not a second specific region that is a part or all of a region of the document sheet, includes predetermined restriction information which is indicated by a density that is equal to or higher than the determined density; and
   a restriction processing portion configured to, when the determination processing portion determines that the second specific region includes the restriction information, restrict a specific process concerning the image data from being executed.

3. The information processing apparatus according to claim 2, wherein
   the determination processing portion generates binarized data by binarizing densities of pixels of the second specific region with the determined density, and determines, based on the binarized data, whether or not the second specific region includes the restriction information.

4. The information processing apparatus according to claim 2, wherein
   the second specific region is provided on each of a plurality of locations that are separated from each other on the document sheet, and the determination processing portion determines, based on the image data, whether or not any one of a plurality of second specific regions includes the restriction information.

5. An image forming apparatus comprising the information processing apparatus according to claim 2.

6. An information processing apparatus comprising:
   a first addition processing portion configured to add density information to a first specific region that is provided in a blank region that is a peripheral edge part of a document sheet region of a document sheet represented by image data, the density information being indicated by a reference density that is lower than a density index value that is derived based on densities of pixels included in the image data; and
   a second addition processing portion configured to add restriction information to a second specific region that is a part or all of a region of the document sheet, the restriction information being indicated by a density that is equal to or higher than the reference density.

7. The information processing apparatus according to claim 6, wherein
   the second specific region is provided on each of a plurality of locations that are separated from each other on the document sheet, and
   the second addition processing portion adds a plurality of pieces of restriction information to a plurality of second specific regions provided on the plurality of locations.

8. The information processing apparatus according to claim 7, wherein
   the plurality of pieces of restriction information are reverse to each other in the plurality of second specific regions.

* * * * *